United States Patent [19]
Poirier

[11] 3,963,327
[45] June 15, 1976

[54] DEVICE FOR OPERATING FRUSTO-CONICAL OPTICAL CONCENTRATORS

[75] Inventor: Albert Poirier, Saint-Benoit, France

[73] Assignee: Ulnic France, Paris, France

[22] Filed: Nov. 25, 1974

[21] Appl. No.: 527,113

[30] Foreign Application Priority Data
Nov. 23, 1973 France .......................... 73.41871

[52] U.S. Cl. ............................ 350/287; 350/96 R
[51] Int. Cl.² .......................................... G02B 7/18
[58] Field of Search ............ 250/227; 350/287, 310, 350/96 R

[56] References Cited
UNITED STATES PATENTS

| | | | |
|---|---|---|---|
| 3,263,070 | 7/1966 | Hine | 350/96 R UX |
| 3,604,802 | 9/1971 | Ohmori et al. | 350/96 R UX |

Primary Examiner—John K. Corbin
Assistant Examiner—F. L. Evans
Attorney, Agent, or Firm—Sughrue, Rothwell, Mion, Zinn & Macpeak

[57] ABSTRACT

A device for operating frusto-conical optical concentrators made of a refringent material of refractive index n, the major base of which is in the vicinity of a source S, said device comprising, at the upper portion of a frustum of a cone, a frusto-conical reflector surrounding said frustum over a given height along the frustum axis of symmetry, the inner surface of said frusto-conical reflector being parallel to the frustum lateral surface and located at a small distance therefrom, and said given height being at least equal to the ordinate of a point A as measured along the frustum axis of symmetry from the apex of said frustum, point A being the point at which the ray emitted by source S which is the most inclined with respect to the frustum axis of symmetry, undergoes its first reflection on the frustum surface, at an angle to the normal to the frusto-conical lateral surface at point A, said angle being smaller than the angle of total reflection.

6 Claims, 4 Drawing Figures

DEVICE FOR OPERATING FRUSTO-CONICAL OPTICAL CONCENTRATORS

The present invention relates to a device for operating frusto-conical optical concentrators.

As is well known, frusto-conical optical concentrators constituted by a frustum of a cone defined by two plane surfaces (or buses) form the object of a number of industrial applications, in particular as regards the concentration of the light-rays emitted by a source situated along the frustum axis of symmetry, in the vicinity of the major base. The dimensions of the frustum should comply with their destination: the length and the vertex angle gamma of said frustum of a cone are selected according to the nature of the source, to the angular aperture of the rays that impinge on the major base and to the constant-flux maximum concentration or optimal illumination which it is desired to achieve on the minor base of the frusto-conical optical concentrator. For more detailed information relating to such optical concentrators, it is suggested to refer to U.S. Pat. No. 3,535,016 corresponding to French Pat. No. 1,543,165 and also to the inventor's thesis entitled "Maximum optical concentration in radiation receivers optimized conical mirrors."

When intense sources S are involved, it is often advisable to channel the light rays which may happen to escape through the frustum walls; moreover, it is necessary to maintain that frustum of a cone in a fixed position relative to the source without, on the one hand, damaging said frustum by means of too rigid clamping devices, likely to undergo thermal expansion due to the important heat-flux emitted by the source, which would generate too large stresses in the refringent material forming said frustum and would lead to the formation of cracks, and, on the other hand, so that the materials firmly supporting and maintaining said frustum can withstand the important heat-flux emitted by the source without failing. More specifically, the invention relates to a device for operating frusto-conical optical concentrators made of a refringent material with a refractive index $n$ and the major base of which is in the vicinity of a source S, said device being adapted to maintain the optical concentrator fixed with respect to said source under suitable conditions, to cool the metal parts located in the vicinity of a portion of the surface thereof and to optimize the flux issuing from the minor base of frustum C.

The device according to the invention is characterized in that it comprises a frusto-conical reflector R at the upper portion of frustum C. Said reflector R surrounds the concentrator along a height 1 measured along the frustum axis of symmetry; the inner surface of reflector R, of frusto-conical shape, is parallel with the outer surface of frustum C and the spacing between the two frustums is small (viz about a few milimmeters at most, and at least a few tenths of a millimeter).

Height 1 of reflector R, as measured along the frustum axis of symmetry and reckoned from the frustum minor base, is at least equal to the ordinate of point A, as measured along the frustum axis of symmetry from the apex of said frustum of a cone. Point A is the one at which a ray R emitted by source S (and most slanted with respect to the frustum axis of symmetry) undergoes a first reflection on the frustum surface, at an angle to the normal to the lateral surface of the frustum at point A smaller than the total reflection angle.

Therefore, according to the invention, reflector R, e.g. of metal, is mounted in such a manner that all the rays intersecting the lateral surface of frustum C undergo a reflection on reflector R and are re-directed toward frustum C. This improvement permits to save a substantial portion of the light energy which, being recovered within frustum C, is emitted through the minor base of said frustum, and, moreover, these rays neither dazzle nor heat any object located along their paths at more or less uncontrolled angles. The frusto-conical internal surface (e.g. of metal) of reflector R is specularly polished in order that absorption and diffusion be minimal.

Reflector R is mounted at a small distance from frustum C, in order that pressurized air may be contingently allowed to flow with a view to cooling the frustum and reflector R and, moreover, for avoiding the immersion phenomenon which would happen should said metal reflector R be in intimate contact with the surface of frustum C. In the latter case, indeed, the index $n'$ corresponding to the metal reflector being different from unity, the angle of total reflection would no longer be given by the relation $$\sin \lambda = (1/n)$$

wherein is the total reflection angle measured with respect to the normal to the interface between two media having different indices, but by the relation $$\sin \lambda = (n'/n)$$

since $n'$ is higher than unity, the critical angle $\lambda$ corresponding to total reflection in the case of immersion would be increased, so that many rays adapted to undergo total reflection between a medium of refractive index $n$ and a medium of index equal to unity (air), would no longer undergo total reflection, which would be detrimental since a portion of the hight-energy would be absorbed by the metal.

Should index $n'$ be a complex number, the real part thereof would be used in the above formulas. In order to avoid total reflection it is necessary that the spacing between the two media of respective indices $n$ and $n'$, should be greater than several times the wave-length of the light involved.

This explains why a spacing of the order of a millimeter between frustum C and reflector R perfectly meets that requirement, while permitting a cooling gas contingently used to flow between the frustum and the reflector. It is possible, in theory, to calculate the value of height 1, assuming one knows the position of source S, the value of the apex angle $\gamma$ of frustom C and the aperture $\theta$ of the beam impinging the major base of said frustum.

As regards that theoretical calculation, reference will advantageously be had to pages 190 and sq. of the above mentioned thesis.

In specific cases, it is also possible to resort to the sometimes easier graphical construction, consisting in drawing the path of the ray having the maximum inclination with respect to the entrance face of the frustum, and to measure the ordinate of point A at which reflection is not total.

According to a preferred embodiment, the device comprises:

a cylindrical tube T, externally threaded at the lower portion thereof, to which is attached reflector R, a spring surrounding frustum C, an end A' of which presses agains the base of reflector R, an approximately frusto-conical shim fixed to end B of said spring, a threaded ring, the inner diameter of which is smaller than the diameter of frustum C, in threaded relation with the lower portion of tube T.

Such a device permits to maintain frustum C within tube T, by means of a resilient device capable of withstanding high temperature increases without damaging the frustum.

According to another embodiment, said device comprises;

a cylindrical tube T threaded at the lower portion thereof, to which is attached reflector R, a threaded ring, the diameter of which is smaller than that of frustum C, adapted to be threadedly engaged with the lower portion of tube T, and provided with a shoulder, a seal pressing against the shoulder of said threaded ring, a counter-ring adapted to be threaded to the upper end of said threaded ring and to crush said seal against frustum C.

According to a preferred embodiment, the device is characterized in that it comprises means for causing pressurized cold air in the vicinity of frustum C, of the spring and of reflector R. That air flux is intended to cool those metal parts in the vicinity of the source and of the frustum that are submitted to the intension radiations emitted by said source and, accordingly intensely heated. That cooling step prevents a too important thermal expansion of the metal parts, likely to compress the frustum which is fragile, to the point of scaling or breaking it.

According to an embodiment, cylindrical tube T is provided with openings on the lateral walls thereof, which allows a better airing and a possible watch of the device inside during operation and permits to cause the pressurized air flux to flow through said openings. The metal parts forming the tube, the spring, the shim and the threaded ring are of a metal with a small thermal expansion coefficient, e.g. steel or invar.

According to a variant, the threaded ring is serrated on the plan horizontal portion thereof, so that, when it is screwed onto tube T, it is in contact with frustum C merely through the serrations thereof pressed against the lower portion of said frustum of a cone.

In view of these serrations, the frustum portion masked by the threaded ring pressing against that frustum is made smaller, so that the maximum amount of light emitted by source S can penetrate into said frustum.

The devices for fixing the frustum according to the invention are advantageous since frustum C is firmly anchored into tube T, so that, should be emitting bulbs located in the vicinity of the base of frustum C happen to burst, said frustum C would not be damaged.

Other features of the invention will appear from the following description and the accompanying drawing, in which.

Figure 1:
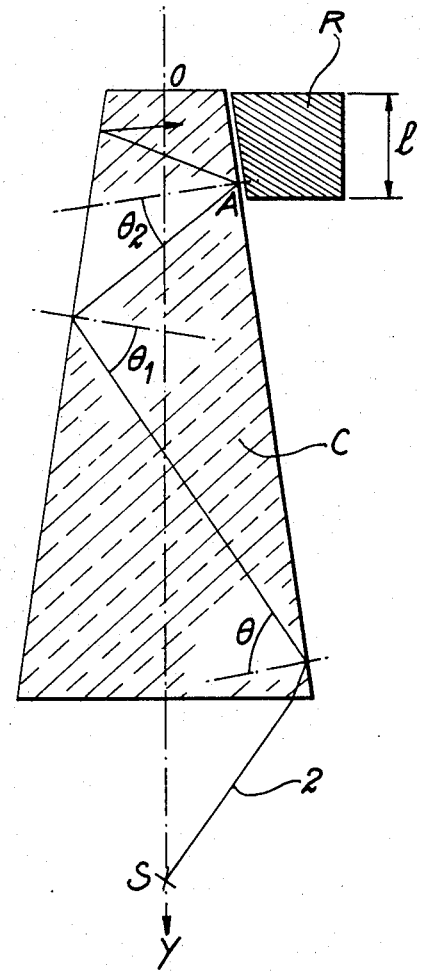
FIG. 1 shows diagrammatically the location of reflector R according to the angles of reflection of a ray on the frustum faces.

In FIG. 1 is shown the position of a portion of reflector R (on one side only of the frustum) in the vicinity of frustum C. The light ray 2 emitted by source S is the one approximately corresponding to the minimum angle $\theta$ of first reflection on the walls of the frustum. The angle between ray 2 and the normal to the frustum wall decreases from each reflection to the following reflection; angle $\theta_1$ is smaller than $\theta$ and greater than $\theta_2$. In the specific example shown in the figure, where the refractive index of the refringent medium forming the frustum of a cone is $n$, angle $\theta$, is greater than the total reflection angle, whereas angle $\theta_2$ is smaller than the total reflection angle.

Thus, point A is the first point at which reflection is not total. It appears quite obvious that, since angle $\theta$ is the minimum angle for all the rayons penetrating into the frustum and emitted by source S, point A is the first point at which a ray emitted by source S is not submitted to total reflection. According to the invention, the height of reflector R (designated by 1) is equal to, or slightly greater than (as shown in the figure), the ordinate of point A as measured along axis Oy from point O.

Figure 2:
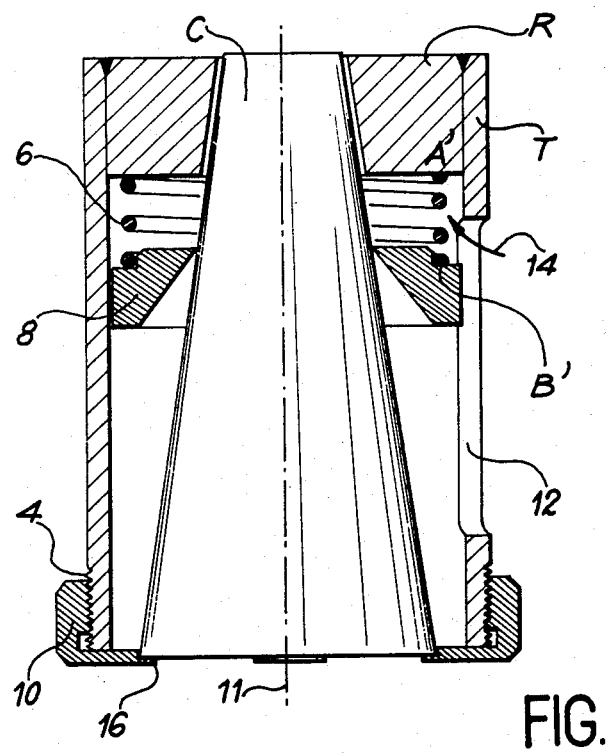
FIG. 2 shows, in cross-section, a device according to the invention for maintaining the frustum fixed with respect to the reflector.

In FIG. 2 is shown, diagrammatically and in cross-section, the device according to the invention for locating frustum C in the vicinity of reflector R in tube T.

Cylindrical tube T, to which reflector R is fixed, e.g. by welding, is externally threaded at the lower portion thereof. A spring 6 mounted around frustum C is fixed, at A', to reflector R, and, at B', to shim 8.

An internally threaded ring 10 is screwed to threaded portion 4 of tube T. While it is being thus screwed, the ring pushes frustum C upwardly. Threaded ring 10 is locked at the moment frustum C starts rising above reflector R.

Shim 8 freely slides in tube T. For mounting frustum C inside cylindrical tube T, said frustum is introduced through the base of tube T, while spring 6 is released and shim 8 is hanging freely. Then, one screws threaded ring 10 that pushes frustum C and the latter drives shim 8 that compresses spring 6. Shim 8 locks frustum C within cylindrical tube T symmetrically with respect to axis 11 of said tube T. According to a variant, the pressurized air flux intended to cool reflector R and frustum C passes through recesses 12 in tube T, in the direction of arrow 14.

Figure 3:
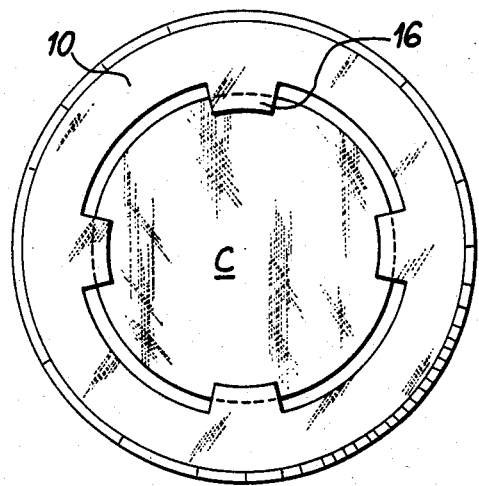
FIG. 3 is a lower view of the threaded ring pressing against the frustum major base.

FIG. 3 shows, seen from under, the threaded ring 10 for maintaining frustum C on its major base by means of indentations 16.

Figure 4:
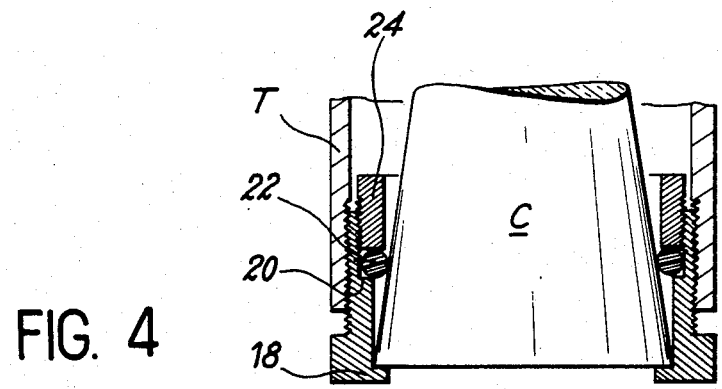
FIG. 4 is a cross-section view of another embodiment of the device for fixing the frustum into tube T.

FIG. 4 shows another embodiment of the device for fixing frustum C into tube T, sais device comprising a ring 18 adapted to be screwed inside tube T and to maintain frustum C in the vertical position.

Ring 18 comprises a shoulder 20 against which presses a seal 22. Counter-ring 24 is screwed to the upper end of ring 18 and is adapted to crush seal 22, the latter serving to maintain frustum C coaxial with tube T.

What is claimed is:

1. A device for operating frusto-conical optical concentrators made of a refringent material of refractive index, n, the major base of which is in the vicinity of a source S, said device comprising, at the upper portion of a frustum of a cone, a frusto-conical reflector surrounding said frustum over a given height along the frustum axis of symmetry, the inner surface of said frusto-conical reflector being parallel to the frustum lateral surface and located at a small distance therefrom, and said given height being at least equal to the ordinate of a point A as measured along the frustum axis of symmetry from the apex of said frustum, point A being the point at which the ray emitted by source S, which is the most inclined ray with respect to the frustum axis of symmetry, undergoes its first reflection on the frustum surface at an angle to the normal to the frusto-conical lateral surface at point A, said angle being smaller than the angle of total reflection.

2. A device according to claim 1, wherein the apparatus for positioning said reflector comprises:
 a cylindrical tube threaded at the lower portion thereof, to which is attached a reflector,
 a threaded ring, the diameter of which is smaller than of frustum, adapted to be threadedly engaged with the lower portion of tube and provided with a shoulder,
 a seal pressing against the shoulder of said threaded ring,
 a counter-ring adapted to be threaded to the upper end of said threaded ring and to crush said seal against frustum.

3. A device according to claim 1 wherein the apparatus for positioning said reflector comprises:
 a cylindrical tube, externally threaded at the lower portion thereof, to which is attached a reflector,
 a spring surrounding frustum, an end of which presses against the base of said reflector,
 an approximately frusto-conical shim fixed to end of said spring,
 a threaded ring, the inner diameter of which is smaller than the diameter of said frustum, in threaded relation with the lower portion of tube.

4. A device according to claim 2, comprising means for causing pressurized cold air to flow in the vicintiy of said frustum of a cone and of said reflector.

5. A device according to claim 4, wherein said cylindrical tube comprises openings in the lateral walls thereof.

6. A device according to claim 2, wherein said threaded ring is serrated in the plane horizontal portion thereof.

* * * * *